UNITED STATES PATENT OFFICE.

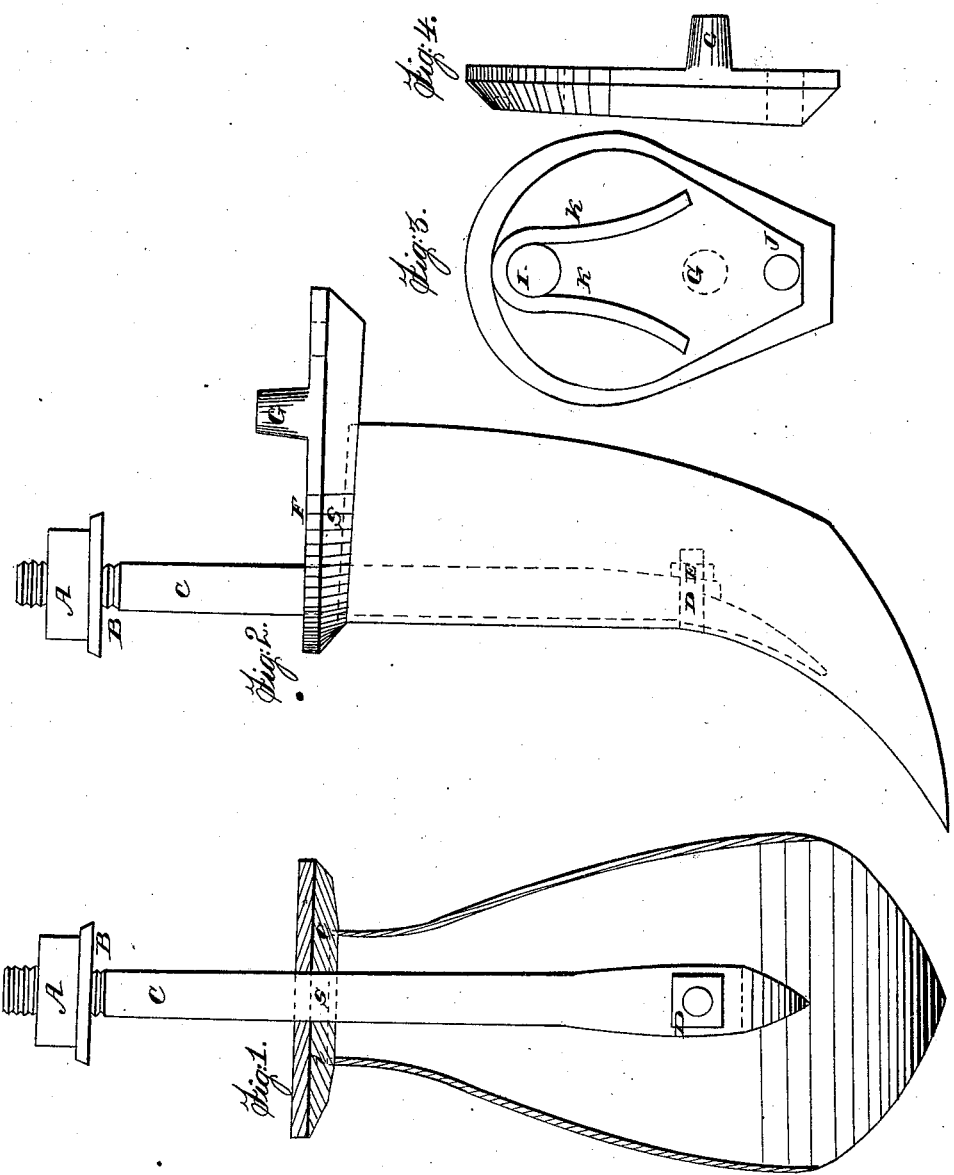

JOSEPH STOCKDALE, OF YPSILANTI, MICHIGAN.

IMPROVEMENT IN CULTIVATOR-TEETH.

Specification forming part of Letters Patent No. 12,332, dated January 30, 1855.

*To all whom it may concern:*

Be it known that I, JOSEPH STOCKDALE, of Ypsilanti, in the county of Washtenaw and State of Michigan, have invented a new and useful Machine for Fastening, Securing, or Holding Cultivator-Teeth; and I do hereby declare that the following is a full, clear, and exact description of the construction and operation of the same, reference being had to the accompanying drawings, making a part of this specification, and to the letters of reference and figures marked thereon, to wit:

Figure 1 represents the back of a cultivator-tooth with reversible cast-iron plate thereon. (Marked Fig. 4.) Letter C represents a wrought-iron bolt five-eighths of an inch in size, which forms the shank of the tooth, and to which the said tooth is fastened, as represented by letter D, by bolt and nut or by rivet running up and passing through said reversible cast-iron plates, as represented by Fig. 3, letter I, and also through the frame of the cultivator, and is secured on the top of the frame of said cultivator by washer and nut, (marked A B,) as seen on Fig. 1. The dotted mortise at *i e* on reversible plate, Fig. 1, represents the depth and form which the tooth sets, and is let into the under side of said reversible plate. (Represented on Fig. 3, letter K.)

Fig. 2 represents a side view of cultivator-tooth with wrought-iron shank-screw, washer, and nut, as aforesaid, with letter H, a sectional view and application of reversible cast-iron plate, Fig. 3. The letter G represents a stay-pin cast upon the upper side of said reversible plate, of about three-fourths of an inch in length and round, which is to be inserted in the under side of frame of cultivator, the use of which is to prevent the plate from turning or moving, and also to strengthen the resistance or pressure of the tooth or teeth. The dotted line at letter S, Fig. 4, represents the top of the tooth and the form which the tooth is set into the said reversible plate, as represented by the groove, letters K on Fig. 3, the under side of said plate.

Fig. 3 represents the under side of the reversible cast-iron plate, being made of a greater thickness at one end, as seen in Fig. 4, which may be increased or diminished in size and thickness as may be required. Letter K, as represented in Fig. 3, is the groove into which the upper end of said tooth is inserted for the purpose of securing a permanent and convenient fastening for the cultivator-tooth. Letter J, as seen in Fig. 3, represents a hole through the end of said plate for the reception of a bolt, if found necessary to make said plate more permanent. The said reversible cast-iron plate is designed and made to be used on either side of the frame of the cultivator, and being placed on a line parallel with the inside of the frame of the cultivator, as seen on two dotted lines, (marked Fig. 5,) places the tooth or teeth in the exact position to make straight lands or furrows. Further, the reversible plate, being made of a greater thickness at one end, sets the tooth or teeth in the exact position or pitch for practical use.

What I claim as my invention, and desire to secure by Letters Patent, is—

The reversible cast-iron plate, (marked Fig. 3,) with the groove on the under side, (marked letter K,) round cast-iron stay-pin on upper side, (marked letter G, reference to the drawings,) and also the application of the top of the cultivator-tooth in the groove aforesaid, and also the application of the wrought-iron bolt or shank passing through the said plate, as before described, and represented by letter I, Fig. 3, and also represented by letters C.

JOSEPH STOCKDALE.

In presence of—
WM. R. MARTIN,
GEO. COOK.